(12) United States Patent
Moon et al.

(10) Patent No.: US 11,470,150 B2
(45) Date of Patent: Oct. 11, 2022

(54) AGREED DATA TRANSMIT METHOD AND ELECTRONIC APPARATUS FOR TRANSMITTING AGREED DATA IN NETWORK

(71) Applicant: Korea Advanced Institute of Science And Technology, Daejeon (KR)

(72) Inventors: Jaekyun Moon, Daejeon (KR); Beongjun Choi, Daejeon (KR); Jy Yong Sohn, Daejeon (KR); Dong-Jun Han, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 30 days.

(21) Appl. No.: 16/904,208

(22) Filed: Jun. 17, 2020

(65) Prior Publication Data

US 2020/0404049 A1 Dec. 24, 2020

(30) Foreign Application Priority Data

Jun. 18, 2019 (KR) .......................... 10-2019-0071909

(51) Int. Cl.
*G06F 15/173* (2006.01)
*H04L 67/1074* (2022.01)
*H04L 9/40* (2022.01)
*H04L 9/06* (2006.01)
*H04L 9/00* (2022.01)

(52) U.S. Cl.
CPC .......... *H04L 67/108* (2013.01); *H04L 9/0637* (2013.01); *H04L 63/123* (2013.01); *H04L 63/126* (2013.01); *H04L 9/50* (2022.05)

(58) Field of Classification Search
CPC ... H04L 67/108; H04L 9/0637; H04L 63/123; H04L 63/136; H04L 2209/38
USPC .......................................................... 713/176
See application file for complete search history.

(56) References Cited

U.S. PATENT DOCUMENTS

| | | | | |
|---|---|---|---|---|
| 10,616,324 | B1* | 4/2020 | Kaddoura | H04L 43/04 |
| 10,873,456 | B1* | 12/2020 | Dods | G06N 3/084 |
| 11,081,219 | B1* | 8/2021 | Dods | G06N 3/0454 |
| 11,281,660 | B1* | 3/2022 | Pike | G06F 16/27 |
| 11,321,718 | B1* | 5/2022 | Narendranathan | G06F 21/64 |
| 11,367,065 | B1* | 6/2022 | Umezurike | G06Q 20/363 |
| 2006/0022048 | A1* | 2/2006 | Johnson | H04L 67/04 235/462.1 |

(Continued)

FOREIGN PATENT DOCUMENTS

| | | | |
|---|---|---|---|
| KP | 20190054738 | A | 5/2019 |
| KR | 20140128685 | A | 11/2014 |
| KR | 101882347 | B1 | 7/2018 |

*Primary Examiner* — Thu Ha T Nguyen
(74) *Attorney, Agent, or Firm* — Foley & Lardner LLP

(57) ABSTRACT

A method for transmitting agreed data on a network by an electronic apparatus, the method according to an embodiment of the present invention may include the steps of storing a generation matrix generated on the basis of the number of a plurality of electronic apparatuses including the electronic apparatus participating in the network and the number of a plurality of data blocks to be shared between the plurality of electronic apparatuses and transmitting an agreed data block agreed to be shared with another electronic apparatuses included in the plurality of electronic apparatuses to another electronic apparatus on the basis of the generation matrix.

21 Claims, 3 Drawing Sheets

(56) References Cited

U.S. PATENT DOCUMENTS

| | | | |
|---|---|---|---|
| 2009/0031006 A1* | 1/2009 | Johnson | H04W 4/14 709/218 |
| 2017/0048235 A1* | 2/2017 | Lohe | G06Q 20/065 |
| 2017/0083907 A1* | 3/2017 | McDonough | G06Q 20/3829 |
| 2017/0109735 A1* | 4/2017 | Sheng | H04L 9/3297 |
| 2017/0221052 A1* | 8/2017 | Sheng | G06Q 20/3829 |
| 2017/0228731 A1* | 8/2017 | Sheng | G06Q 20/401 |
| 2018/0191503 A1* | 7/2018 | Alwar | H04L 9/0637 |
| 2018/0302222 A1* | 10/2018 | Agrawal | H04L 9/3213 |
| 2019/0018984 A1* | 1/2019 | Setty | H04L 63/14 |
| 2019/0026672 A1* | 1/2019 | Notani | G06Q 10/06315 |
| 2019/0036887 A1* | 1/2019 | Miller | G07C 9/20 |
| 2019/0122317 A1* | 4/2019 | Hunn | H04L 9/3239 |
| 2019/0147438 A1* | 5/2019 | Micali | G06Q 20/3825 705/71 |
| 2019/0268466 A1* | 8/2019 | Inoue | H04L 9/3247 |
| 2019/0363874 A1* | 11/2019 | Shirley | H04L 9/3239 |
| 2019/0373521 A1* | 12/2019 | Crawford | H04L 67/104 |
| 2020/0026289 A1* | 1/2020 | Alvarez | G07C 5/085 |
| 2020/0026699 A1* | 1/2020 | Zhang | H04L 9/0643 |
| 2020/0074468 A1* | 3/2020 | Arai | G06Q 20/065 |
| 2020/0092085 A1* | 3/2020 | Baek | H04L 9/0643 |
| 2020/0193292 A1* | 6/2020 | Weng | G06Q 30/0185 |
| 2020/0394183 A1* | 12/2020 | Jois | G06F 8/30 |
| 2020/0396059 A1* | 12/2020 | Micali | H04L 9/3239 |
| 2020/0404049 A1* | 12/2020 | Moon | H04L 63/12 |
| 2021/0037008 A1* | 2/2021 | Swaminath | H04L 63/12 |
| 2021/0067319 A1* | 3/2021 | Chung | H04L 9/3239 |
| 2021/0073285 A1* | 3/2021 | Hunter | G06N 3/08 |
| 2021/0073287 A1* | 3/2021 | Hunter | H04L 9/3239 |
| 2021/0217001 A1* | 7/2021 | Harrison | G06Q 20/0658 |
| 2021/0273993 A1* | 9/2021 | Shirley | H04L 67/108 |
| 2021/0365946 A1* | 11/2021 | Zveguintzoff | G06Q 40/125 |
| 2022/0067063 A1* | 3/2022 | Chung | G06F 16/27 |
| 2022/0067669 A1* | 3/2022 | Griffin | G06F 40/205 |
| 2022/0094544 A1* | 3/2022 | Sekar | G06N 5/003 |
| 2022/0171830 A1* | 6/2022 | Gokan | G06F 21/105 |
| 2022/0198562 A1* | 6/2022 | Cella | G06Q 30/0201 |
| 2022/0207022 A1* | 6/2022 | Wood | G06Q 10/10 |

* cited by examiner

Generator matrix G with size( $m \times n$ )

Maximum required bandwidth: max $\{r_{a,b}; a,b \in [6], a \neq b\}$ = S/4

Data Block Security: When z = 2, 3S/4 data security is guaranteed.

Maximum required bandwidth: max $\{r_{a,b}; a,b \in [6], a \neq b\}$ = S/2

Data Block Security: When z = 2, S/2 data security is guaranteed.

AGREED DATA TRANSMIT METHOD AND ELECTRONIC APPARATUS FOR TRANSMITTING AGREED DATA IN NETWORK

CROSS-REFERENCE TO RELATED APPLICATION

This application claims priority to Korean Patent Application No. 10-2019-0071909 filed on Jun. 18, 2019 and all the benefits accruing therefrom under 35 U.S.C. § 119, the contents of which are incorporated by reference in their entirety.

BACKGROUND

The present invention relates to a method for transmitting agreed data on a network and an electronic apparatus for transmitting agreed data on a network, and more specifically, to a method for transmitting agreed data on a network and an electronic apparatus for transmitting agreed data on a network for improving scalability by transmitting only some selected data to each electronic apparatus participating in a network based on a Blockchain technology and allowing the each electronic apparatus to perform an agreement process only between different electronic apparatuses having the same data as the selected data.

Blockchain technology, which has been attracting since the emergence of Bitcoin, is a protocol that enables secure transactions between network users (nodes) without the relay of trusted third parties such as banks. Despite the fact that some of the users participating in the network may take malicious actions double spending attack that makes payment with the same electronic money twice, etc.), Blockchain technology enables safe transactions using mathematical techniques. The key idea to make this possible is to block abnormal transactions by allowing each user to verify the validity of a transaction through the book check by allowing all users to agree and share one unified ledger.

Consensus algorithms currently used in major cryptocurrencies are as follows. Proof of Work (PoW) used in Bitcoin and early Ethereum is based on the fact that there is a limit to the amount of computation of Byzantine adversary, and is a method that requires a certain amount of computation or more when registering a transaction history in a ledger and a user trusts the transaction history that has passed the verification of the amount of computation. Proof of Stake (PoS), which has been recently applied to Ethereum, etc., authorizes the creation of a ledger in proportion to the capital held by a user, and the user trusts a ledger that has proved the equity.

The consensus algorithms have a problem in that a transaction approval rate and a processed transaction volume per hour do not increase even if more users participate. The reason for this is that the generation rate and size of a block containing a transaction history is limited (in the case of PoW and PoS), and the amount of communication available for consensus is limited.

SUMMARY

The present invention has been derived to solve the above-mentioned problems, and an aspect of the present invention is to improve scalability by distributing data to be shared and processed by each node using a network encoding method.

Another aspect of the present invention is to allow only some of the same pieces of data shared by two nodes to be shared between the two nodes, thereby reducing the communication load between nodes.

Yet another aspect of the present invention is to safely restore most data despite the attack of Byzantine adversary with the same power.

According to an aspect of the present invention, there is provided a method for transmitting agreed data on a network by an electronic apparatus, the method according to an embodiment of the present invention may include the steps of storing a generation matrix generated on the basis of the number of a plurality of electronic apparatuses including the electronic apparatus participating in the network and the number of a plurality of data blocks to be shared between the plurality of electronic apparatuses and transmitting an agreed data block agreed to be shared with another electronic apparatuses included in the plurality of electronic apparatuses to another electronic apparatus on the basis of the generation matrix.

A communication bandwidth for the electronic apparatus to transmit the agreed data block to another electronic apparatus may be calculated on the basis of the generation matrix.

The communication bandwidth may be calculated on the basis of the following equation using the generation matrix:

$$\gamma_{a,b} = \sum_{k=1}^{n} G_{a,k} G_{b,k}/n$$

($\gamma_{a,b}$: communication bandwidth, G: generation matrix (m*n), a: electronic apparatus, b: another electronic apparatus, n: the number of data blocks). the number of data blocks).

A storage capacity required for each electronic apparatus included in the plurality of electronic apparatuses may be calculated on the basis of the generation matrix.

The storage capacity ratio required for each electronic apparatus may be calculated on the basis the following equation using the generation matrix:

$$\rho_i = \sum_{j}^{n} G_{i,j}/n$$

($\rho_i$: storage capacity ratio, G: generation matrix (m*n), is i-th electronic apparatus, n: the number of data blocks).

A ratio of an electronic apparatus storing a predetermined data block included in the plurality of data blocks may be calculated on the basis of the generation matrix.

The ratio of an electronic apparatus storing a predetermined data block may be calculated on the basis of the following equation using the generation matrix:

$$\eta_j = \sum_{i}^{m} G_{i,j}/m$$

($\eta_j$: ratio of electronic apparatus, G: generation matrix (m*n), j: j-th predetermined data block, m: the number of plurality of electronic apparatuses).

The size of each of the plurality of data blocks may be all the same.

Each storage capacity required for each of the plurality of electronic apparatuses may be set to be the same.

A maximum communication bandwidth for transmitting the agreed data block may be set to be identical for each of the plurality of electronic apparatuses.

Some data blocks stored in the plurality of electronic apparatuses may be selected among the plurality of data blocks with reference to the generation matrix and stored in each of the plurality of electronic apparatuses.

The step of transmitting an agreed data block may be performed on the basis of a Practical Byzantine Fault Tolerance (PBFT) algorithm.

The electronic apparatus and another electronic apparatus may respectively include at least one data block, and the step of transmitting an agreed data block may include the steps of selecting with reference to the generation matrix only some data blocks identical to the at least one data block included in another electronic apparatus among the at least one data block included in the electronic apparatus and setting the same as the agreed data block, and transmitting the set agreed data block.

According to another aspect of the present invention, there is provided an apparatus for transmitting agreed data on a network, wherein the apparatus may include a memory for storing a generation matrix generated on the basis of the number of a plurality of electronic apparatuses including the electronic apparatus participating in the network and the number of a plurality of data blocks to be shared between the plurality of electronic apparatuses, and a processor for transmitting an agreed data block agreed to be shared with another electronic apparatuses included in the plurality of electronic apparatuses to another electronic apparatus on the basis of the generation matrix.

According to yet another aspect of the present invention, a computer-readable recording medium for recording a computer program according to an embodiment of the present invention may record the above-described method.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
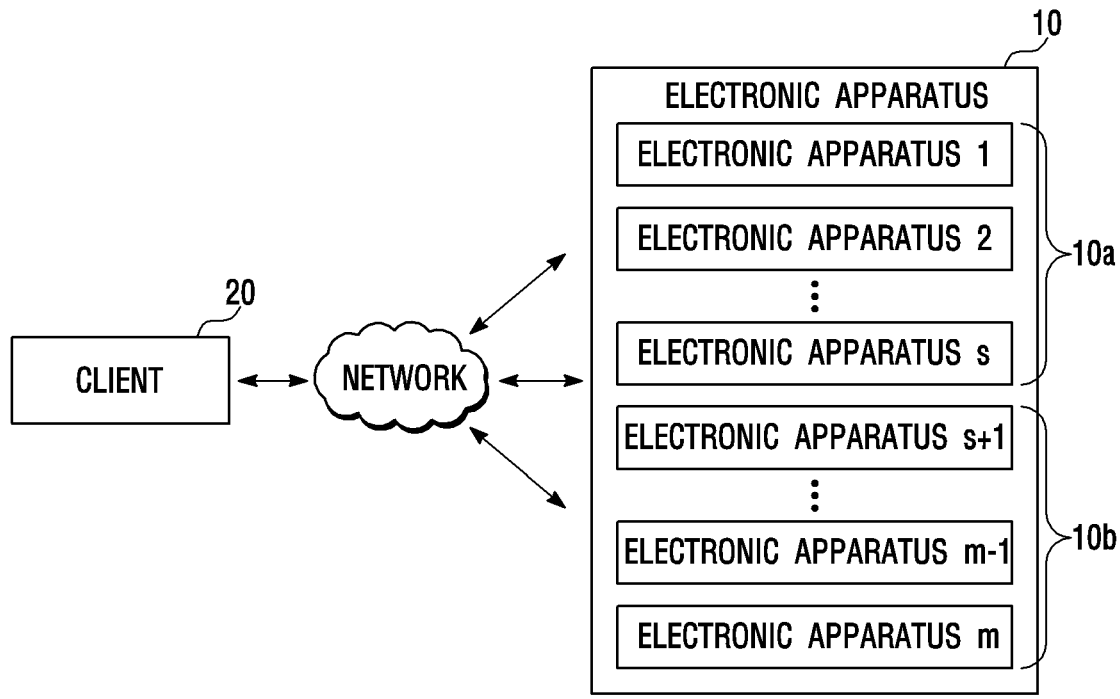
FIG. 1 is a block diagram illustrating a system for transmitting agreed data between a plurality of electronic apparatuses on a network according to the present invention.

The following detailed description of the present invention will be described with reference to the accompanying drawings, which illustrate specific embodiments in which the present invention may be practiced. These embodiments are described in detail enough for those skilled in the art to be able to carry out the present invention. It should be understood that the various embodiments of the present invention are different from each other, but need not be mutually exclusive. For example, certain shapes, structures, and properties described herein may be implemented in other embodiments without departing from the spirit and scope of the invention in relation to one embodiment. In addition, it should be understood that the location or placement of individual components within each disclosed embodiment can be changed without departing from the spirit and scope of the invention. Therefore, the following detailed description is not intended to be taken in a limiting sense, and the scope of the present invention, if appropriately described, is limited only by the appended claims, along with all ranges equivalent to those claimed. In the drawings, similar reference numerals refer to the same or similar functions across various aspects.

FIG. 1 is a block diagram illustrating a system for transmitting agreed data between a plurality of electronic apparatuses on a network according to the present invention.

As illustrated in FIG. 1, a system for transmitting data agreed among a plurality of electronic apparatuses on a network includes a client 20 and a plurality of electronic apparatuses 10.

The client 20 is a module of a customer who would like to be provided with service from the plurality of electronic apparatuses 10, and may transmit a desired transaction processing request message to a specific electronic apparatus.

When the plurality of electronic apparatuses 10 has completed transaction processing, the client 20 may receive a transaction processing completion response message from the plurality of electronic apparatuses 10.

The plurality of electronic apparatuses 10 may receive a transaction processing request from the client 20 on a network, and process transactions among the plurality of electronic apparatuses 10.

In the present invention, a transaction may mean a blockchain transaction. Specifically, each of the plurality of electronic apparatuses may generate contents to be stored as a blockchain transaction, and transmit the transaction to other electronic apparatuses participating in a blockchain network.

The plurality of electronic apparatuses 10 groups data stored in each storage space and chains elements of the grouped data to store the chained data in a blockchain of each storage space. For example, a blockchain of the present invention stores ledger data in a block unit using a hash algorithm to prevent forgery and alteration and configure blocks into a linked list to include the hash value of a previous block in a next block, making it impossible to forge and temper with only one block in the middle.

That is, the blockchain encrypts the next block in succession to the previous block and recognizes only the data that more than a majority of users have consensus as verified data. Therefore, in a distributed database using a blockchain, it is impossible to forge and temper with contents recorded in a transaction.

As illustrated in FIG. 1, in the present invention, some electronic apparatuses 10a (electronic apparatus 1 to electronic apparatus s) among the plurality of electronic apparatuses 10 (electronic apparatuses 1, electronic apparatuses 2 . . . electronic apparatuses m) may be defined as apparatuses for transmitting data between apparatuses, and other apparatuses 10b (electronic apparatus s+1 to electronic apparatus m) may be defined as apparatuses for receiving data from some electronic apparatuses 10a. Some electronic apparatuses 10a and/or the other apparatuses 10b may include one or a plurality of electronic apparatuses, respectively.

However, in FIG. 1, some electronic apparatuses 10a (electronic apparatus 1 to electronic apparatus s) are exemplarily classified as data transmitting apparatuses and the other electronic apparatuses 10b (electronic apparatus s+1 to electronic apparatus m) are exemplarily classified as data receiving apparatuses for convenience of explanation. In the present invention, each of the electronic apparatuses 10 (electronic apparatuses 1, electronic apparatuses 2 . . . electronic apparatuses m) may transmit and receive data.

Figure 2:
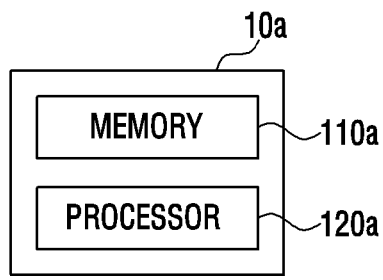
FIG. 2 is a block diagram illustrating the configuration of an electronic apparatus according to the present invention.

As illustrated in FIG. 2, some electronic apparatuses 10a are apparatuses for transmitting data to the other electronic apparatuses 10b, and may include a memory 110a and a processor 120a.

The memory 110a may store commands or data related to at least one other element.

The memory 110a may store software and/or a program.

The memory 110a may store data and/or a blockchain. In particular, in the present invention, the memory 110a may store a data block having divided data and a generation matrix G.

The processor 120a controls at least one other component of the electronic apparatus 10.

The processor 120a may receive a transaction processing request message from the client 20, complete a corresponding transaction, and then transmit a processing completion message to the client 20.

The processor 120a may receive the generation matrix G from the client 20 and store the same in the memory 110a.

The processor 120a may control to transmit only some data to other electronic apparatuses with reference to the generation matrix G.

In the present invention, the electronic apparatus 10 may transmit/receive information between apparatuses through a wireless network, for example, a P2P network. In addition, according to an embodiment, data transmission/reception through a P2P network is possible between the client 20 and the electronic apparatus 10.

The electronic apparatus 10 of the present invention may include an electronic apparatus such as a smart phone, a table PC, and a computer. Also, in addition to be above, a home appliance, a wearable device, various medical apparatuses, and the like may be included.

In addition, the network of the present invention includes a network connected in wired/wireless communication in various manners. For example, a long-range/short-range wireless communication network such as WiFi, LAN, LTE, WIBRO, Bluetooth, and the like may be included.

Figure 3:
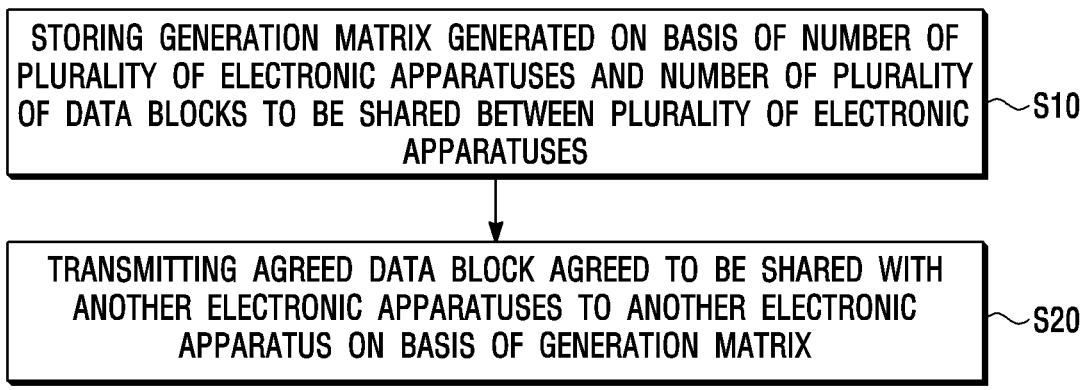
FIG. 3 is a flowchart illustrating a method for transmitting agreed data on a network by an electronic apparatus according to the present invention.

FIG. 3 is a flowchart illustrating a method for transmitting agreed data on a network by the electronic apparatus 10a according to the present invention.

Before entering into the specifics, in the present invention, some electronic apparatuses 10a among the plurality of electronic apparatuses 10 (electronic apparatuses 1, electronic apparatuses 2 . . . electronic apparatuses m) may be defined as apparatuses for transmitting an agreed data block on the basis of the generation matrix G, and the other apparatuses 10b, which are remaining electronic apparatuses except for some electronic apparatuses 10a, may be defined as apparatuses for receiving the agreed data block. Some electronic apparatuses 10a and/or the other apparatuses 10b may include one or a plurality of electronic apparatuses, respectively.

In FIG. 1, some electronic apparatuses 10a (electronic apparatus 1 to electronic apparatus s) are exemplarily classified as agreed data block transmitting apparatuses and the other electronic devises 10b (electronic apparatus s+1 to electronic apparatus m) are exemplarily classified as agreed data block receiving apparatuses for convenience of explanation. In the present invention, each of the electronic apparatuses 10 (electronic apparatuses 1, electronic apparatuses 2 . . . electronic apparatuses m) may transmit and receive an agreed data block. For example, each of the electronic apparatuses (electronic apparatus 1 to electronic apparatus 3) illustrated in FIG. 5 may transmit or receive an agreed data block, and among the apparatuses, some agreed data block transmitting apparatuses are classified into some electronic apparatuses 10a, and agreed data block receiving apparatuses are classified into the other electronic apparatuses 10b. Also, the above may be applied the same/similar in other drawings.

In addition, the above-described some electronic apparatuses 10a are hereinafter simply referred to as the electronic apparatus 10a.

As illustrated in FIG. 2, the electronic apparatus 10a may store the generation matrix G generated on the basis of the number of a plurality of electronic apparatuses 10 participating in a network and the number of a plurality of data blocks to be shared between the plurality of electronic apparatuses 10 s10.

The generation matrix G is a reference scale for determining how to distribute the total data to the plurality of electronic apparatuses 10 participating in the network, and is a matrix newly generated in the present invention to apply a network encoding algorithm to a Practical Byzantine Fault Tolerance (PBFT) algorithm. The network encoding algorithm and the Practical Byzantine Fault Tolerance (PBFT) algorithm will be described in detail later.

In particular, in the present invention, the total data is not shared by all of the electronic apparatuses 10, but some data is uniformly divided so as to be stored and managed in each electronic apparatus, so that expandability may be improved compared to a typical blockchain algorithm.

Figure 5:
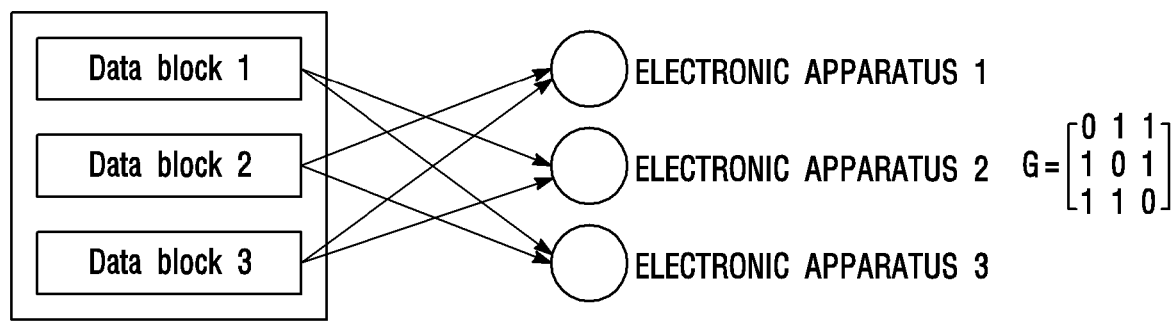

In the present invention, data may be shared in a blockchain manner, and may be divided into data blocks and distributed to each electronic apparatus. For example, as illustrated in FIG. 5, data blocks may be uniformly distributed to each electronic apparatus with reference to the generation matrix G (two data blocks are allocated to each electronic apparatus), and each electronic apparatus may store the generation matrix G together with the two data blocks.

Figure 6:
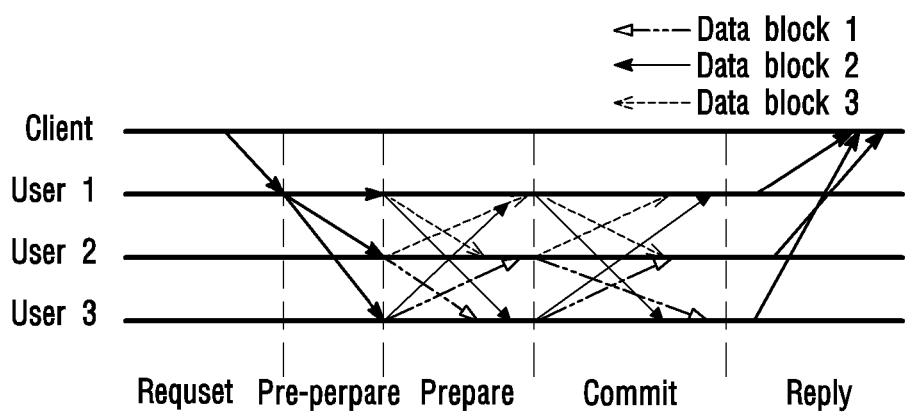
FIG. 6 is a diagram referenced to illustrate agreed data block transmission steps of the present invention; and FIG. 7

According to an embodiment, the electronic apparatus 10a may directly receive the generation matrix G from the client 20 as shown in FIG. 6, and according to another embodiment, may receive and store the generation matrix G from the client 20 from another electronic apparatus via another electronic apparatus.

The electronic apparatus 10a may transmit only the agreed data block agreed to be shared with the other electronic apparatuses 10b to the other electronic devises 10b on the basis of the generation matrix G s20.

Hereinafter, referring to FIG. 4 and FIG. 5, the step s10 of storing the generation matrix G and variables representing a performance measure of a network encoding algorithm of the present invention will be described.

Figure 7:
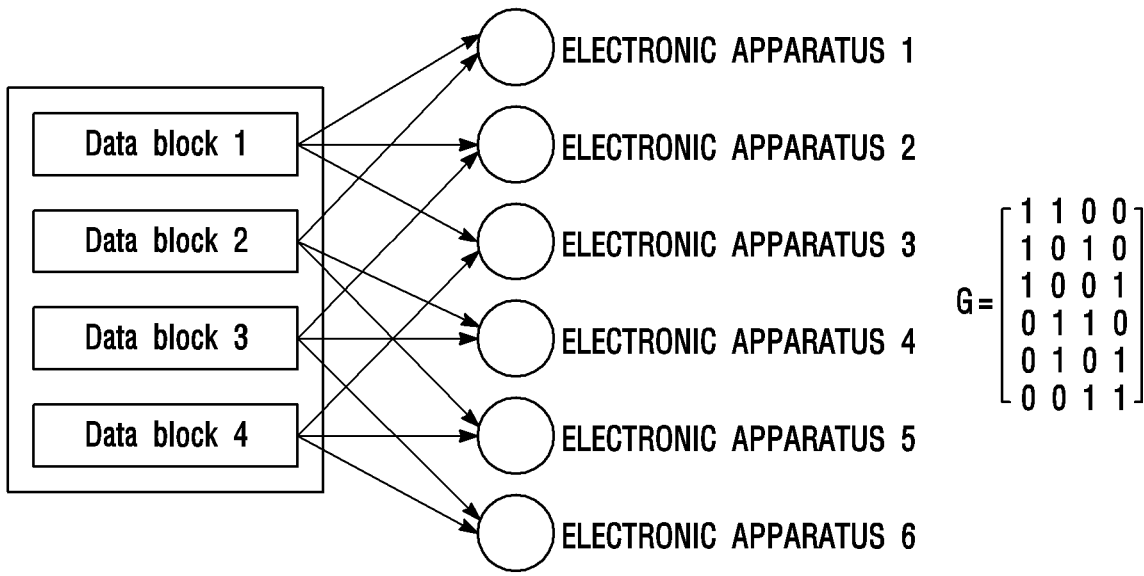

The network encoding algorithm of the present invention is a coding technique for dividing data to be agreed on into uniform data blocks and selects and stores one or more data blocks in each electronic apparatus 10. According to the corresponding encoding technique, the maximum communication bandwidth for transmitting data is relatively reduced as shown in FIG. 7 when compared to that of FIG. 8 in which a typical sharding technique has been applied, so that it is possible to relatively safely store data despite the attack by the Byzantine adversary.

The present invention has been implemented by an algorithm based on Practical Byzantine Fault Tolerance (PBFT) that draws consensus by acknowledging data blocks agreed by multiple electronic apparatuses through communication between the plurality of electronic apparatuses 10 as actual data. A specific design method of the network encoding agreement algorithm according to the present invention is as follows.

First, variables required for designing an encoding consensus algorithm are as follows:
G: Generation matrix (m×n)
S: Total size of data desired to be agreed on in system
m: The number of electronic apparatuses participating in system
z: The number of malicious electronic apparatuses participating in system (z<m/2)
n: The number of data blocks
k: The number of electronic apparatuses that need to be accessed to obtain complete ledger.

Variables which may represent the performance scale of the encoding consensus algorithm are as follows. A variable $\rho_i$ representing storage space efficiency means a storage space required for an i-th electronic apparatus when standardizing the total size of data to be to 1, $\eta_j$ means a ratio of electronic apparatuses storing j-th data block. A variable representing the communication bandwidth required for the agreement between an electronic apparatus a and an electronic apparatus b is $\gamma_{a,b}$.

$$\rho_i = \sum_{j}^{n} G_{i,j}/n:$$

storage space required for a i-th electronic apparatus (compared to replication method)

$$\eta_j = \sum_{i}^{m} G_{i,j}/m:$$

Electronic apparatuses distribution ratio in a j block $$\gamma_{a,b} = \sum_{k=1}^{n} G_{a,k} G_{b,k}/n:$$

Communication bandwidth between Electronic apparatus A (electronic apparatuses) and Electronic apparatus b (Other electronic apparatuses) required for agreement (compared to replication method)

For reference, the replication method is a complete replication method in which all of the electronic apparatuses respectively store all of the data to be agreed on.

That is, at least one of the communication bandwidth for transmitting the agreed data block to the other electronic apparatuses 10b by the electronic apparatus 10a, the storage capacity required for each electronic apparatus included in the plurality of electronic apparatuses 10, and the ratio of the electronic apparatus storing a predetermined data block included in the plurality of data blocks may be calculated on the basis of the generation matrix G.

In the present invention, it is assumed that the maximum communication bandwidth which may be used for forming a data block by uniformly dividing the size of data and for the consensus between the storage capacity of each electronic apparatus and a node are all the same. Therefore, the following expression is established. ([m] means {1, . . . , m}.)

$$\rho = \rho_i \text{ (For all } i \in [m])$$

$$\gamma \ge \gamma_{a,b} \text{ (For all } a,b \in [m], a \ne t)$$

The memory 110a of the electronic apparatus 10a may store the generation matrix G together with data blocks selected and divided uniformly on the basis of the generation matrix G.

Figure 4:
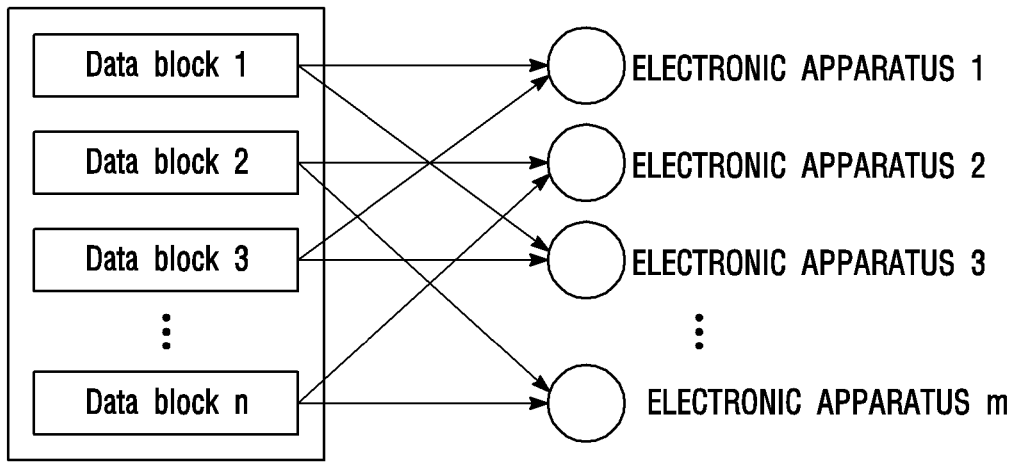
FIG. 4 and FIG. 5 are diagrams referenced to illustrate a step of storing a generation matrix (G) and variables representing a performance measure of and a network encoding algorithm of the present invention.

FIG. 4 and FIG. 5 are diagrams referenced to illustrate a network encoding algorithm according to the present invention. The network encoding technique is applied in the process of dividing data into multiple data block units and distributing the same to each electronic apparatus. When the number of data blocks is n, and the number of electronic apparatuses is m, a generation matrix G having a size of m×n has a value of $G_{i,j}=1$ when an electronic apparatus i stores a data block j, and has a value of $G_{i,j}=0$ otherwise. $G_{i,j}$ represents a (i,j) section of a generation matrix G.

FIG. 5 illustrates a process of dividing data into three data blocks in total and distributing two data blocks to three electronic apparatuses. In addition, each data block is distributed only to two electronic apparatuses.

Specifically, FIG. 5 exemplarily illustrates that Data block 2 and Data block 3 among all the data blocks are selected and stored in Electronic apparatus 1, Data block 1 and Data block 3 among all the data blocks are selected and stored in Electronic apparatus 2, and Data block 1 and Data block 2 among all the data blocks are selected and stored in Electronic apparatus 3.

That is, some data blocks stored in the plurality of electronic apparatuses 10 may be selected among the plurality of data blocks with reference to the generation matrix G and stored in each of the plurality of electronic apparatuses 10, and since each data block is not distributed to all electronic apparatuses as in the prior art, scalability may be improved.

Hereinafter, referring to FIG. 6, the step of transmitting an agreed data block s20 of the present invention will be described.

The processor 120a may transmit a data block agreed by applying the PBFT algorithm on the basis of the generation matrix G stored in the memory 110a.

Specifically, the electronic apparatus 10a and the other electronic apparatuses 10b respectively include at least one data block, and the processor 120a may select with reference to the generation matrix G only some data blocks identical to the at least one data block included in the other electronic apparatuses 10b among the at least one data block included in the electronic apparatus 10a and set the same as the agreed data block, and transmitting the set agreed data block.

When the generation matrix (G) is given, a consensus process is depicted in FIG. 6. FIG. 6 is a consensus algorithm based on the generation matrix $$G = \begin{bmatrix} 0 & 1 & 1 \\ 1 & 0 & 1 \\ 1 & 1 & 0 \end{bmatrix}$$

of FIG. 5. The consensus algorithm is composed of 5 steps in total (request, pre-prepare, prepare, commit, and reply). First, a client transmits a consensus request on generated data to one Electronic apparatus 1 (request step). A node received the request is referred to as a primary node. When the primary node receives the consensus request, the node is subjected to a pre-prepare step for transmitting the corresponding request to all other nodes. Nodes other than the primary node (Electronic apparatus 2 and Electronic apparatus) are referred to as backup nodes. When the backup nodes determine that the consensus request is legitimate, the backup nodes create a prepare message and transmit the message to the rest of the notes in the network. (The criteria that the backup nodes determine that a transaction is legitimate may include a method for verifying a client's public key signature, and the like.) The prepare message is transmitted to only the electronic apparatuses having the corresponding data block, which depends on the generation matrix G. For example, in FIG. 5, Electronic apparatus 2 has Data blocks 1 and 3, but only Electronic apparatus 3 has Data block 1 (except Electronic apparatus 2). Therefore, when Electronic apparatus 2 sends the prepare message, a verification message for Data block 1 is not transmitted to Electronic apparatus 1, but only to Electronic apparatus 3. Meanwhile, since only Electronic apparatus 1 has Data block 3 (except Electronic apparatus 2), Data block 3 is transmitted only to Electronic apparatus 1. That is, only some data blocks identical to the at least one data block included in the other electronic devises $10b$ are selected among the at least one data block included in the electronic apparatus $10a$ to transmit an agreed data block.

Therefore, different information is transmitted to each node during the prepare process. Based on the message received in the prepare step, an electronic apparatus performs verification of each message block. When $z+1$ or more electronic apparatuses, which is more than the number of malicious electronic apparatuses, agree on the corresponding message block, the corresponding message block becomes to be in a prepared certificate state. Then, electronic apparatuses having a message block in the prepared certificate state transmit a commit message to other electronic apparatuses in the network (commit step). In the commit step, as in the prepare step, a message is transmitted only between electronic apparatuses having the corresponding data block, and the agreed data block is transmitted. When $z+1$ number of commit messages from an electronic apparatus are collected, the corresponding data block becomes to be in a commit certificate state. If all the data blocks held by the electronic apparatus satisfy both the prepared certificate and the commit certificate, a reply that the consensus has been reached is sent to the client (reply step). If more than a certain number of replies are sent to the client, the consensus process ends.

That is, in the case of the present invention, a network encoding consensus algorithm may be applied to the Practical Byzantine Fault Tolerance (PBFT) algorithm to transmit an agreed data block. In addition, only some data blocks selected on the basis of the generation matrix G are divided and distributed to each electronic apparatus 10, and some electronic apparatuses $10a$ select only some data blocks that are identically stored in the other electronic apparatuses $10b$ among some stored data blocks to perform the consensus process, so that even when there are many network users, it is possible to reach a consensus by reducing network communication and user storage space limitations. Also, when variables required in system design are given, such as storage capacity of each node, required security, bandwidth available for communication between nodes, and the number of users, an adaptive consensus system design reflecting the variables becomes possible.

Hereinafter, referring to FIG. 7 and FIG. 8, it will be described that when the network encoding consensus algorithm of the present invention is applied, a maximum bandwidth is more effectively narrowed compared to a typical data distribution method using sharding.

Figure 8:
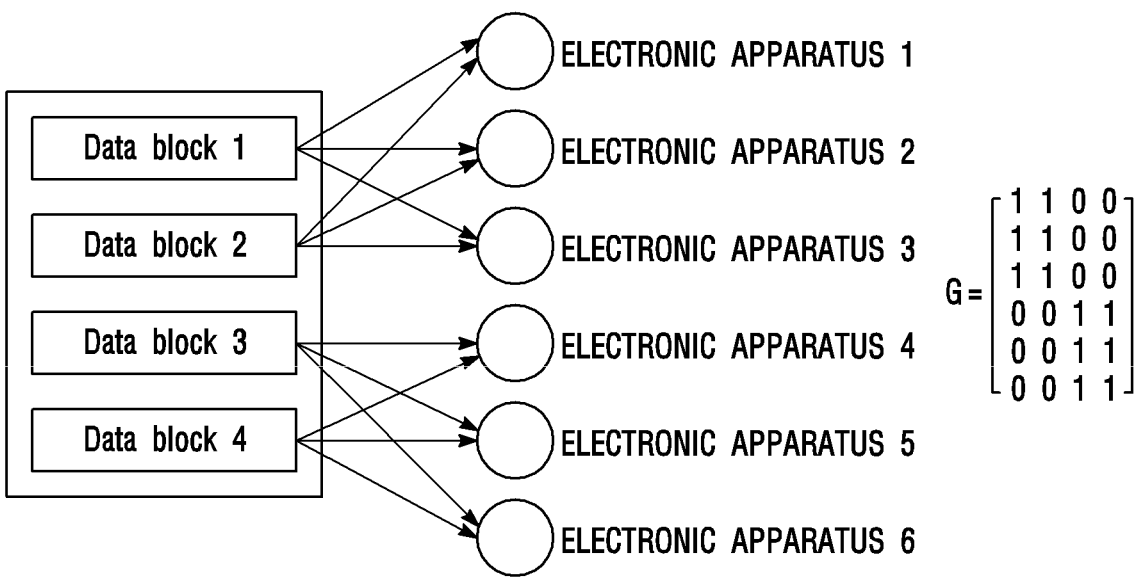
FIG. 8 is a drawing referenced to illustrate that, when a network encoding consensus algorithm of the present invention is applied, a maximum bandwidth is more effectively narrowed compared to a typical data distribution method using sharding.

For reference, G drawn in a sharding method illustrated in FIG. 8 is a concept that is not present in a typical sharding method, and is a matrix generated to describe the generation matrix G which is generated by the network encoding consensus algorithm of the present invention and compare with the sharding method.

The network encoding consensus method according to the present invention has an advantage in that a maximum bandwidth required for the communication between nodes is reduced and data may be relatively safely stored despite the attack by the Byzantine adversary.

FIG. 7 and FIG. 8 show a data distribution method using the network encoding consensus algorithm and a data distribution method using a conventional sharding, respectively. For a fair comparison, in both cases, data was divided into a total of four data blocks, and the storage capacity of each electronic apparatus was set to be constant at S/2.

In FIG. 7 to which the encoding technique is applied, each electronic apparatus shares a maximum of one data block with other electronic apparatuses, so that the maximum value of communication bandwidth between any two nodes required for consensus is S/4. On the other hand, in the conventional sharding technique of FIG. 8, the electronic apparatuses must transmit the entire data held by themselves to electronic apparatuses belonging to the same shard, so that the maximum value of the communication bandwidth between nodes is S/2.

Considering the case in which two Byzantine electronic apparatuses are present, in FIG. 7 to which the network encoding technique is applied, at most one data block may be damaged. More specifically, each data block is divided and stored in three different electronic apparatuses, and when two or more of the three persons having the corresponding data block agree, a majority rule for approving the corresponding block is applied. When the network encoding technique of FIG. 7 is applied, the safety of three data blocks may be secured even if any two electronic apparatuses take malicious actions. In contrast, when a typical sharding technique is used as shown in FIG. 8, there is a risk that up to two data blocks are damaged.

When system design parameters and required performance indicators are given, a generation matrix G for achieving the same may be designed as follows. When the storage capacity limit of each electronic apparatus is given as B, data blocks of a B/5 ratio may be stored compared to a full replication method. Therefore, the generation matrix G must satisfy the following inequality.

$$\rho = \rho_i = \sum_i G_{i,j}/n \leq B/S$$

When the limit of communication bandwidth between nodes is given as I, the generation matrix G must satisfy the following inequality.

$$r = r_{a,b} = \sum_{k=1}^{n} G_{a,k} \ G_{b,k}/m \leq I$$

When there are z Byzantine adversaries among m electronic apparatuses, the generation matrix G must satisfy the following inequality for full security of data. Specifically, when the ratio of Byzantine electronic apparatuses is less than half the ratio of electronic apparatuses storing each data block, all the data blocks are safely managed.

$$\min_{i \in [m]} \eta_i > 2z/m$$

The embodiments described above may be implemented in the form of program instructions which may be executed through various computer components and recorded in a computer-readable recording medium. The computer-readable recording medium may include, alone or in combination, program instructions, data files, data structures, and the like.

Program instructions that are recorded in the computer-readable recording medium may be specially designed and configured for the present invention, or may be known and available to those skilled in the field of computer software.

Examples of computer-readable recording medium include magnetic media such as hard disks, floppy disks and magnetic tapes, optical recording media such as CD-ROM and DVD, magneto-optical media, such as floptical disks, and a hardware device specially configured to store and execute program instructions such as ROM, RAM, flash memory, and the like. Examples of program instructions include machine codes, such as those created by a compiler, as well as advanced language codes that may be executed by a computer using an interpreter, and the like. The hardware device may be configured to operate as one or more software modules to execute processing according to the present invention, and vice versa.

According to the present invention, scalability may be improved by distributing data to be shared and processed by each node using a network encoding method.

According to the present invention, only some of the same pieces of data shared by two nodes are allowed to be shared between the two nodes, so that communication load between nodes may be reduced.

According to the present invention, it is possible to safely restore most data despite the attack by the Byzantine adversary with the same power.

The encoding consensus algorithm of the present invention has the possibility to cope with security attacks (double spending attack, Finney attack, etc.) on the blockchain system. In the near future, where Blockchain is expected to be used in various applications, security will become an even more important issue and is expected to be the basis for building a secure Blockchain.

The features, structures, effects, and the like described in the above embodiments are included in one embodiment of the present invention, but are not necessarily limited to the one embodiment. Furthermore, the features, structures, effects, and the like illustrated in each embodiment may be combined or modified in other embodiments and implemented by those skilled in the art to which the embodiments belong. Therefore, it should be interpreted that the contents related to such a combination and modification are included in the scope of the present invention.

In addition, the above description has been made with reference to an embodiment, but it is merely illustrative and does not limit the present invention. It will be understood by those skilled in the art that various modifications and applications not illustrated above are possible without departing from the essential characteristics of the present embodiment. For example, each component specifically shown in the embodiment may be modified and implemented. Differences related to such a modification and application should be construed as being included in the scope of the invention defined in the appended claims.

What is claimed is:

1. A method for transmitting agreed data on a network by an electronic apparatus, the method comprising the steps of:
   storing a generation matrix generated on the basis of the number of a plurality of electronic apparatuses including the electronic apparatus participating in the network and the number of a plurality of data blocks to be shared between the plurality of electronic apparatuses, wherein the generation matrix represents whether an electronic apparatus of the plurality of electronic apparatuses stores a data block of the plurality of data blocks; and
   transmitting an agreed data block agreed to be shared with another electronic apparatus included in the plurality of electronic apparatuses to the another electronic apparatus on the basis of the generation matrix,
   wherein the step of transmitting the agreed data block includes applying a Practical Byzantine Fault Tolerance (PBFT) algorithm on the basis of the stored generation matrix,
   wherein a communication bandwidth for the electronic apparatus to transmit the agreed data block to the another electronic apparatus is calculated on the basis of the following equation using the generation matrix:

$$\gamma_{a,b} = \sum_{k=1}^{n} G_{a,k} G_{b,k}/n$$

wherein $\gamma_{a,b}$ is the communication bandwidth, G is the generation matrix (m*n), a is an electronic apparatus, b is another electronic apparatus, n is the number of data blocks.

2. The method of claim 1, wherein a storage capacity required for each electronic apparatus included in the plurality of electronic apparatuses is calculated on the basis of the generation matrix.

3. The method of claim 2, wherein a storage capacity ratio required for each electronic apparatus is calculated on the basis the following equation using the generation matrix:

$$\rho_i = \sum_{j}^{n} G_{i,j}/n$$

wherein $\rho_i$ is the storage capacity ratio, G is the generation matrix (m*n), i is an i-th electronic apparatus, and n is the number of data blocks.

4. The method of claim 1, wherein a ratio of an electronic apparatus storing a predetermined data block included in the plurality of data blocks is calculated on the basis of the generation matrix.

5. The method of claim 4, wherein the ratio of an electronic apparatus storing a predetermined data block is calculated on the basis of the following equation using the generation matrix:

$$\eta_j = \sum_{i}^{m} G_{i,j}/m$$

wherein $\eta_j$ is the ratio of the electronic apparatus, G is the generation matrix (m*n), j is a j-th predetermined data block, m is the number of plurality of electronic apparatuses.

6. The method of claim 1, wherein the size of each of the plurality of data blocks is all the same.

7. The method of claim 1, wherein each storage capacity required for each of the plurality of electronic apparatuses is set to be the same.

8. The method of claim 1, wherein a maximum communication bandwidth for transmitting the agreed data block is set to be identical for each of the plurality of electronic apparatuses.

9. The method of claim 1, wherein some data blocks stored in the plurality of electronic apparatuses are selected among the plurality of data blocks with reference to the generation matrix and stored in each of the plurality of electronic apparatuses.

10. The method of claim 1, wherein:
the electronic apparatus and another electronic apparatus respectively comprise at least one data block, and
the step of transmitting an agreed data block comprises the steps of:
selecting with reference to the generation matrix only some data blocks identical to the at least one data block included in another electronic apparatus among the at least one data block included in the electronic apparatus and setting the same as the agreed data block; and
transmitting the set agreed data block.

11. An electronic apparatus for transmitting agreed data on a network, the apparatus comprising:
a memory for storing a generation matrix generated on the basis of the number of a plurality of electronic apparatuses including the electronic apparatus participating in the network and the number of a plurality of data blocks to be shared between the plurality of electronic apparatuses, wherein the generation matrix represents whether an electronic apparatus of the plurality of electronic apparatuses stores a data block of the plurality of data blocks; and
a processor for transmitting an agreed data block agreed to be shared with another electronic apparatus included in the plurality of electronic apparatuses to the another electronic apparatus on the basis of the generation matrix,
wherein the processor transmits the agreed data block by applying a Practical Byzantine Fault Tolerance (PBFT) algorithm on the basis of the generation matrix stored in the memory,
wherein a communication bandwidth for transmitting the agreed data block to another electronic apparatus is calculated on the basis of the following equation using the generation matrix:

$$\gamma_{a,b} = \sum_{k=1}^{n} G_{a,k} G_{b,k}/n$$

wherein $\gamma_{a,b}$ is the communication bandwidth, G is the generation matrix (m*n), a is an electronic apparatus, is another electronic apparatus, n is the number of data blocks.

12. The apparatus of claim 11, wherein a storage capacity required for each electronic apparatus included in the plurality of electronic apparatuses is calculated on the basis of the generation matrix.

13. The apparatus of claim 12, wherein a storage capacity ratio required for each electronic apparatus is calculated on the basis the following equation using the generation matrix:

$$\rho_i = \sum_{j}^{n} G_{i,j}/n$$

wherein $\rho_i$ is the storage capacity ratio, G is the generation matrix (m*n), i is an i-th electronic apparatus, and n is the number of data blocks.

14. The apparatus of claim 11, wherein a ratio of an electronic apparatus storing a predetermined data block included in the plurality of data blocks is calculated on the basis of the generation matrix.

15. The apparatus of claim 14, wherein the ratio of an electronic apparatus storing a predetermined data block is calculated on the basis of the following equation using the generation matrix:

$$\eta_j = \sum_{i}^{m} G_{i,j}/m$$

wherein $\eta_j$ is the ratio of electronic apparatus, G is the generation matrix (m*n), j is the j-th predetermined data block, m is the number of plurality of electronic apparatuses.

16. The apparatus of claim 11, wherein the size of each of the plurality of data blocks is all the same.

17. The apparatus of claim 11, wherein each storage capacity required for each of the plurality of electronic apparatuses is set to be the same.

18. The apparatus of claim 11, wherein a maximum communication bandwidth for transmitting the agreed data block is set to be identical for each of the plurality of electronic apparatuses.

19. The apparatus of claim 11, wherein some data blocks stored in the plurality of electronic apparatuses are selected among the plurality of data blocks with reference to the generation matrix and stored in each of the plurality of electronic apparatuses.

20. The apparatus of claim 11, wherein the electronic apparatus and another electronic apparatus respectively comprise at least one data block, and the processor performs the step of transmitting an agreed data block by selecting with reference to the generation matrix only some data blocks identical to the at least one data block included in another electronic apparatus among the at least one data block included in the electronic apparatus and setting the same as the agreed data block, and transmitting the set agreed data block.

21. A non-transient computer-readable recording medium containing for recording a computer program for causing a processor to perform executing the a method comprising:

storing a generation matrix generated on the basis of the number of a plurality of electronic apparatuses including the electronic apparatus participating in the network and the number of a plurality of data blocks to be shared between the plurality of electronic apparatuses, wherein the generation matrix represents whether an electronic apparatus of the plurality of electronic apparatuses stores a data block of the plurality of data blocks; and transmitting an agreed data block agreed to be shared with another electronic apparatus included in the plurality of electronic apparatuses to the another electronic apparatus on the basis of the generation matrix, wherein the step of transmitting the agreed data block includes applying a Practical Byzantine Fault Tolerance (PBFT) algorithm on the basis of the stored generation matrix, wherein a communication bandwidth for transmitting the agreed data block to another electronic apparatus is calculated on the basis of the following equation using the generation matrix:

$$\gamma_{a,b} = \sum_{k=1}^{n} G_{a,k} G_{b,k} / n$$

wherein $\gamma_{a,b}$ is the communication bandwidth, G is the generation matrix (m*n), a is an electronic apparatus, is another electronic apparatus, n is the number of data blocks.

* * * * *